United States Patent
Blalock

[19]

[11] Patent Number: 6,107,567
[45] Date of Patent: Aug. 22, 2000

[54] WATER-RESISTANT CONDUIT BOX FOR LARGE ELECTRIC MOTOR, MOUNTABLE IN A PLURALITY OF ORIENTATIONS

[75] Inventor: Christopher A. Blalock, Ellenboro, N.C.

[73] Assignee: Reliance Electric Technologies, LLC, Thousand Oaks, Calif.

[21] Appl. No.: 09/120,952

[22] Filed: Jul. 22, 1998

[51] Int. Cl.[7] .................................................. H01H 9/02
[52] U.S. Cl. .......................... 174/58; 174/17 CT; 174/48; 174/50; 220/3.8; 220/3.9; 220/3.92; 439/535
[58] Field of Search ................................ 174/48, 50, 58, 174/66, 17 CT, 55, 57; 220/3.2, 3.8, 4.02, 241, 3.92, 3.9; 439/535, 556, 569

[56] References Cited

U.S. PATENT DOCUMENTS

| | | | |
|---|---|---|---|
| 2,059,671 | 11/1936 | Steenweg | 220/3.92 |
| 3,359,359 | 12/1967 | Beck et al. | |
| 3,482,895 | 12/1969 | Becklin | 312/352 |
| 3,564,112 | 2/1971 | Algotsson | |
| 3,620,404 | 11/1971 | Grasso | 220/447 |
| 4,710,658 | 12/1987 | Stahl | |
| 4,800,238 | 1/1989 | Gesvent | |
| 5,177,325 | 1/1993 | Giammanco | |
| 5,192,888 | 3/1993 | Fleer | |
| 5,391,837 | 2/1995 | Carey | |
| 5,578,791 | 11/1996 | Bosse, Jr. | 174/48 |
| 5,668,422 | 9/1997 | Deynet | |
| 5,721,394 | 2/1998 | Mulks | 174/48 |

*Primary Examiner*—Kristine Kincaid
*Assistant Examiner*—Dhiru R. Patel
*Attorney, Agent, or Firm*—Craig N. Killen; John J. Horn; William R. Walbrun

[57] ABSTRACT

A water resistant conduit box has a main box portion with open ends capped by respective cover plates. The main box portion has a perimeter flange structure extending outwardly around the perimeter of one open end. One end plate is removably attached to the main box portion such that a perimeter lip thereof extends about the flange structure. The main box portion has a perimeter seat structure integrally extending about the second open end. The seat structure is configured to create a recessed seat to which another end plate is removably attached. This end plate may itself define a recessed seat in which a mounting flange of the motor housing is received. Due to its construction, the conduit box may be "rotated" into a variety of orientations while still retaining desired water resistance all around.

24 Claims, 6 Drawing Sheets

6,107,567

WATER-RESISTANT CONDUIT BOX FOR LARGE ELECTRIC MOTOR, MOUNTABLE IN A PLURALITY OF ORIENTATIONS

BACKGROUND OF THE INVENTION

The present invention relates generally to conduit boxes which mount on an electric motor. More particularly, the invention relates to an improved conduit box that remains water-resistant in a variety of mounting orientations.

Electric motors, particularly high horsepower electric motors of the type used to power industrial machinery, often have conduit boxes to house the connection between lead wires from the motor and feed wires from a source of electricity. Because these motors are often used outdoors, it is desirable to protect the interior of the conduit box from exposure to the elements. Toward this end, various techniques have been utilized to ensure that the conduit box is relatively water-resistant.

As will be explained more fully below, conduit boxes of the prior art have been provided with deflection lips at various interface locations. The deflection lips serve to divert rainwater and the like that could otherwise enter the interior of the conduit box. The location at which deflection lips are placed will often depend on the requirements of a user. For example, the user may require the feed wires to be run into a particular side of the conduit box. Based on these requirements, the conduit box will be specially constructed to achieve the desired water resistance.

While water-resistant conduit boxes of the prior art have worked well for their intended purpose, they are not without disadvantages. As noted, these conduit boxes have often been specially constructed based on the requirements of a particular user. This has resulted in inefficiencies in the manufacturing process. In addition, dedicated conduit boxes limit flexibility to meet changing requirements in the field.

SUMMARY OF THE INVENTION

The present invention recognizes and addresses the foregoing considerations and others of prior art constructions and methods. Accordingly, it is an object of the present invention to provide various novel arrangements for an electric motor conduit box.

It is a further object of the present invention to provide a conduit box for a large electric motor which may be used in a variety of orientations.

It is a more particular object of the present invention to provide a conduit box which can be rotated to a multitude of positions while still maintaining its water-resistant characteristics.

It is a further object of the present invention to provide a conduit box which facilitates access by a worker in the field.

Some of these objects are achieved by a conduit box having a main box portion, polygonal in shape with two ends. At least one end has a flange structure extending outwardly away from respective sides of the main box portion. One end plate has a perimeter lip extending generally perpendicular to the main plate portion thereof, towards the main box portion. The perimeter lip covers the flange structure on the main box portion, thus providing a water-resistant junction in any intended orientation.

The other end of the conduit box may have a seat structure inwardly extending around the perimeter towards the inside of the main box portion. This seat structure is preferably shaped in such a manner so that it defines a recessed seat for mounting of an end plate. For example, the seat structure may be formed as three perpendicular flange parts integrally extending inwardly from side walls of the main box portion. By mounting an end plate in the recessed seat, this end of the main box portion is also water resistant in any intended orientation.

Cover plates at either end may have a lead wire opening at which the conduit box is attached to mounting structure on the motor housing. Lead wires from the motor may extend through this opening into the interior of the main box portion. A side opening for power supply feed wires may also be provided on the main box portion. In one exemplary embodiment, a cover plate defining a perimeter lip mates with a protruding flange of the side opening to achieve water resistance in any desired orientation.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
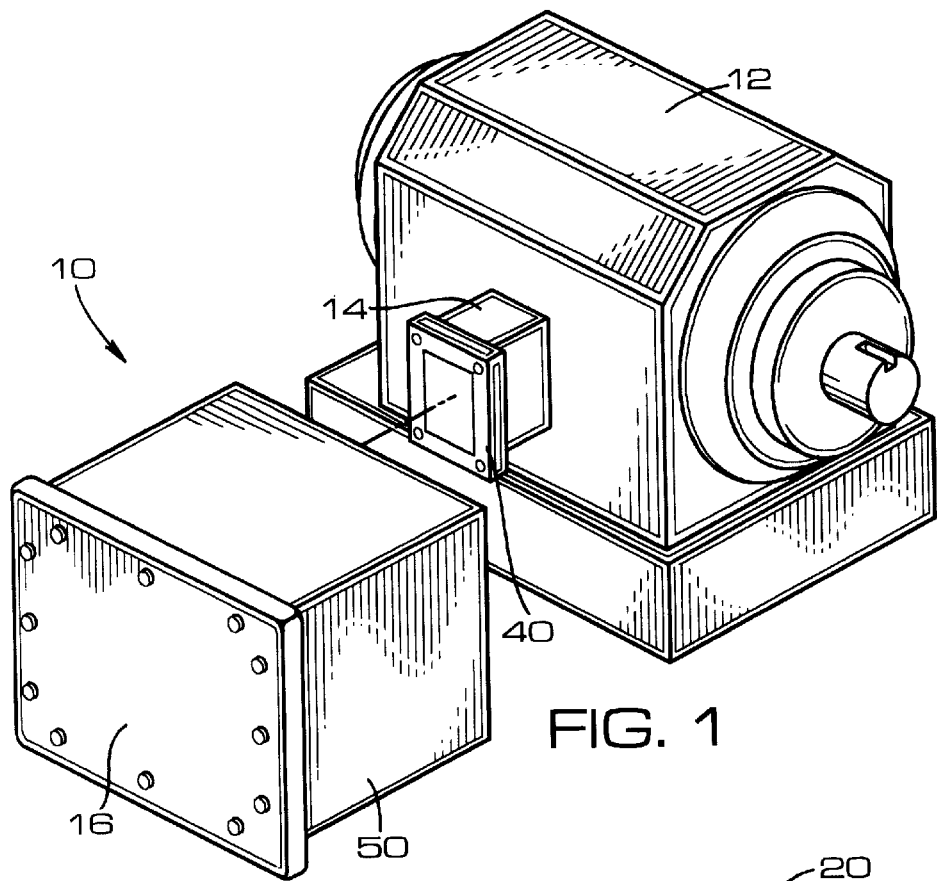
FIG. 1 is a perspective view of a conduit box of the present invention in conjunction with an electric motor.

Repeat use of reference characters in the present specifications and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, even though broader aspects are embodied in the present invention.

FIG. 1 illustrates a conduit box 10 of the present invention in conjunction with a relatively large electric motor 12. Conduit box 10 attaches to a conventional mounting structure 14 through which motor lead wires extend. Feed wires from a source of electric power pass through a side wall of conduit box and are electrically connected therein to respective motor lead wires. Conduit box 10 includes a front plate 16 which may be removed so that a worker can access the box interior to make the electrical connections, or for maintenance purposes. Unlike the prior art, conduit box 10 may be rotated into multiple orientations while still retaining its desirable water-resistant characteristics.

Figure 2:
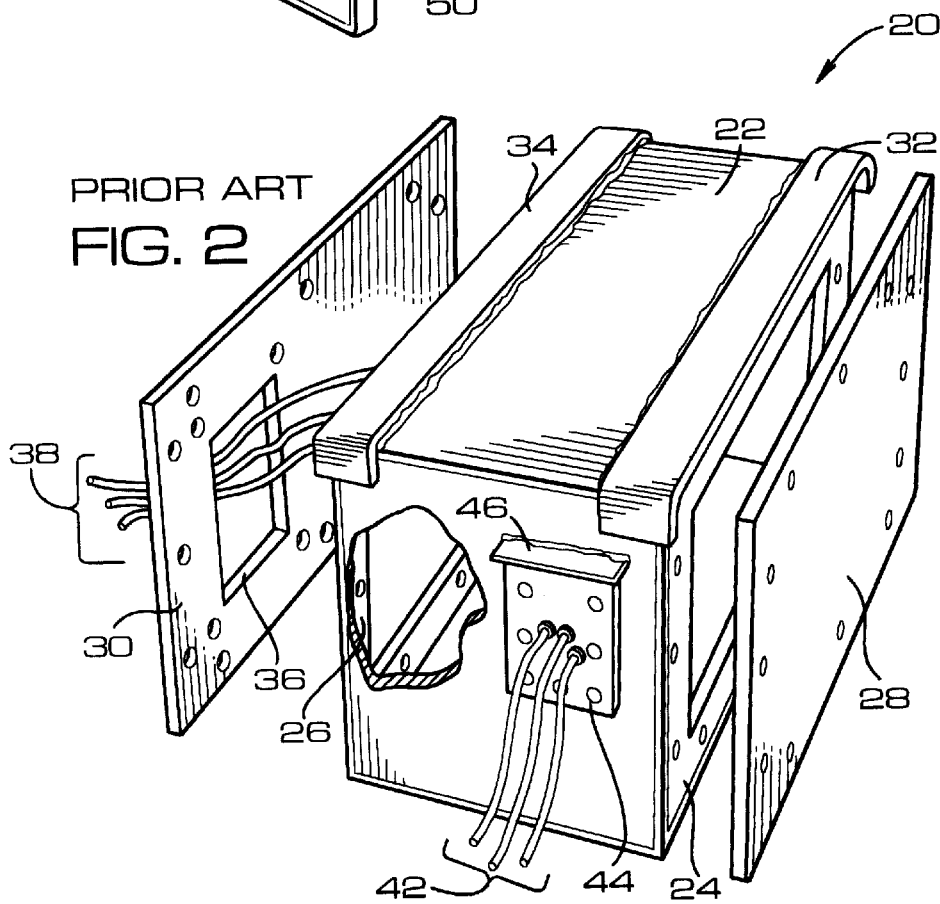
FIG. 2 is an exploded view of a prior art conduit box which has been used with an electric motor as shown in FIG. 1.

Before further details of the present invention are described, it is helpful to discuss the prior art in greater detail. Thus, FIG. 2 illustrates a water-resistant conduit box 20 constructed in accordance with the prior art. Conduit box 20 includes a main box portion 22 having inwardly facing flanges 24 and 26 at respective open ends thereof. A front plate 28 and a rear plate 30 are removably attached to the respective flanges 24 and 26 to cover the open ends of main box portion 22. Deflection lips 32 and 34 are welded to main box portion 22 to cover the interface with plates 28 and 30, respectively. Deflection lips 32 and 34 thus serve to divert away rainwater and the like that could otherwise enter the interior of conduit box 20.

As shown, rear plate 30 defines an opening 36 through which the lead wires (collectively 38) of the motor extend into main box portion 22. Opening 36 is dimensioned to mate with a flange 40 (FIG. 1) of mounting structure 14. Feed wires (collectively 42) from the power source enter conduit box 20 through holes defined in a plate 44 covering a side wall opening in main box portion 22. A deflection lip 46 may be welded above plate 44 to divert water that could enter conduit box 20 at this location. It will be appreciated that conduit box 20 of the prior art will be water-resistant only when used in the particular orientation for which it was designed.

Figure 3:
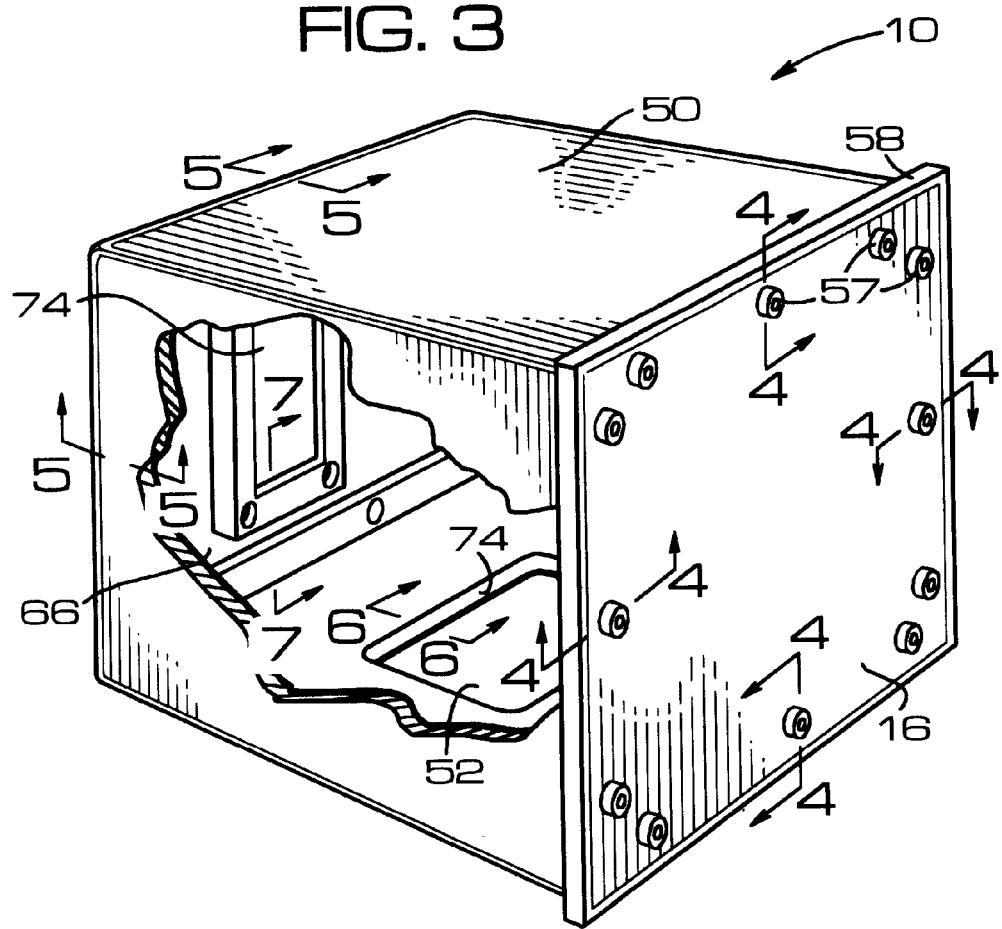
FIG. 3 is a further perspective view, partially cut away, of the conduit box of FIG. 1.
Figure 4:
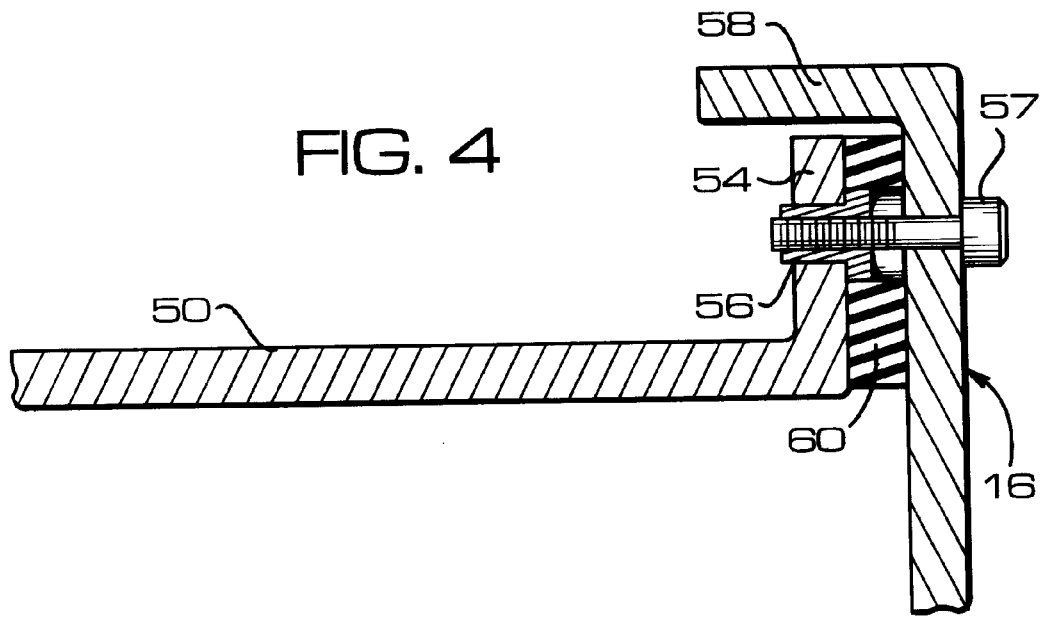
FIG. 4 is an enlarged cross-sectional view as taken along lines 4—4 of FIG. 3.
Figure 8:
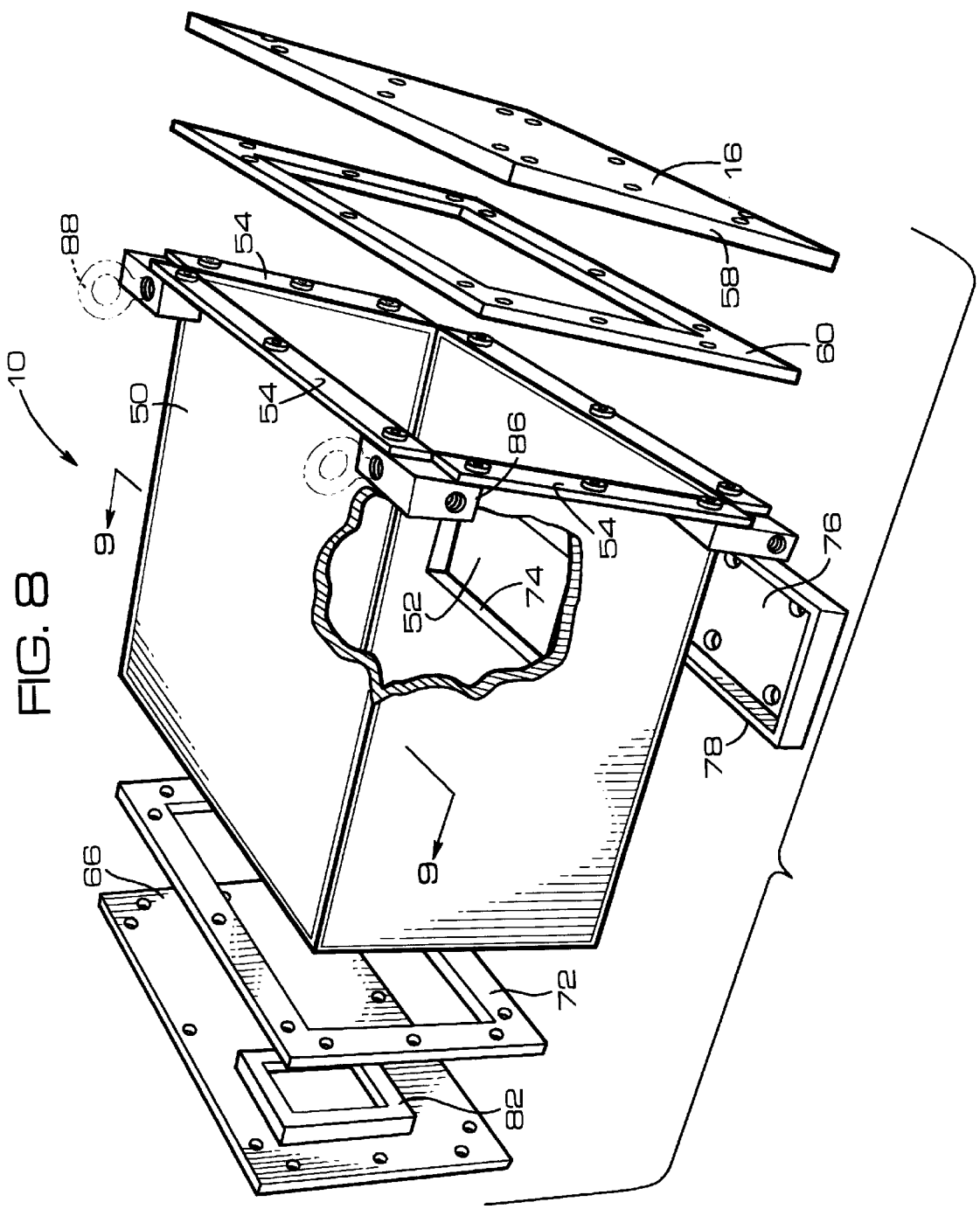
FIG. 8 is an exploded perspective view of the conduit box of FIG. 1 illustrating various additional features thereof.

Referring now to FIG. 3 and other figures as indicated, conduit box 10 of the present invention will be described in greater detail. As can be seen, conduit box 10 includes a main box portion 50 having four sides, one of which defines a feed wire opening 52. As can be seen in FIGS. 4 and 8, one axial end of main box portion 50 has flanges 54 extending outwardly in a direction perpendicular to the respective side from which they emanate. Each flange 54 preferably defines a plurality of holes for receipt of a respective fastener 56 therein. In the illustrated embodiment, fasteners 56 will be engaged by bolts 57 to retain end plate 16 in position.

End plate 16 includes a perimeter lip 58 in order to ensure the interface with main box portion 50 will be water-resistant. As shown, lip 58 is generally perpendicular to the main plate portion of end plate 16, and extends towards main box portion 50. When end plate 16 is removably attached to main box portion 50, lip 58 covers flanges 54 to provide water resistance. Specifically, rain water and the like impinging upon conduit box 10 will tend to be deflected away from the interface between main box portion 50 and end plate 16. Further water resistance is provided by a perimeter gasket 60 of rubber or other suitable gasket material.

The outward orientation of flanges 54 desirably ensures that the opening of main box portion 50 at this end will be as large as the interior dimension. As shown in FIG. 2, this is in contrast to conduit box 20, wherein flange 24 extended inwardly from the side walls of main box portion 22. As a result, the opening of main box portion 22 is smaller than its interior dimensions. This serves to inhibit access to the interior of main box portion 22 by maintenance personnel and the like.

Figure 5:
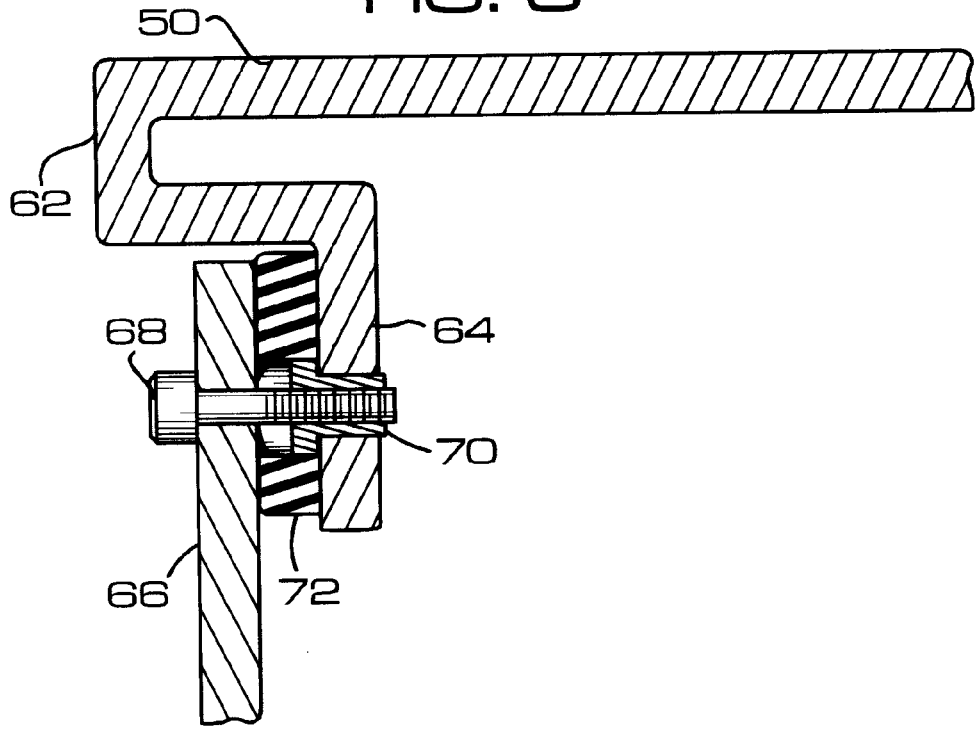
FIG. 5 is an enlarged cross-sectional view as taken along lines 5—5 of FIG. 3.

Referring now to FIG. 5, the other end of main box portion 50 includes an inwardly directed seat structure 62 defining a recessed seat portion 64. A back plate 66 of conduit box 10 is received in seat portion 64 and removably attached to main box portion 50 at this location. In the illustrated embodiment, attachment is achieved by a plurality of bolts 68 engaging respective fasteners 70. As shown, the bolts may extend through respective holes defined about the periphery of back plate 66. These holes align with holes of seat portion 64 having respective fasteners 70 therein.

It will be appreciated that placement of back plate 66 in a recessed seat will enhance the water resistance of conduit box 10. In other words, water will tend to flow away from the interface, without entering main box portion 50. A perimeter gasket 72 is also preferably provided to further enhance water resistance at this location. It should also be noted that the compound bends of seat structure 62 provide additional stiffness to main box portion 50.

Figure 6:
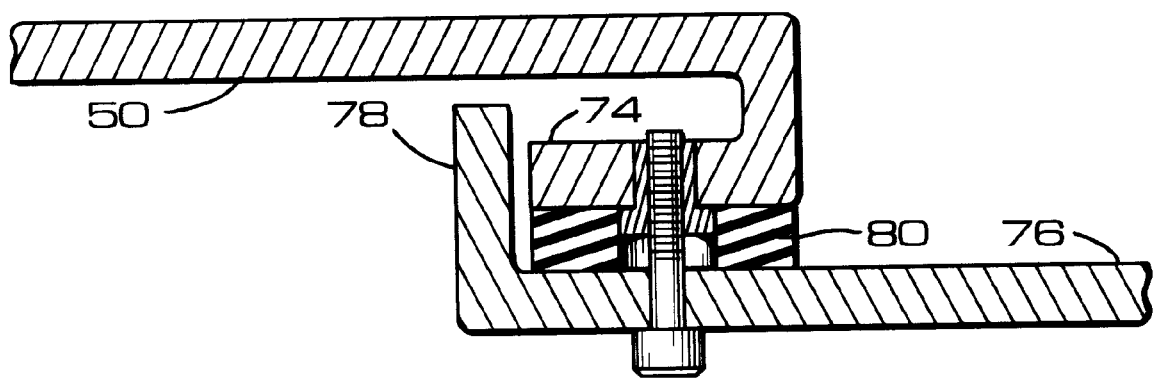
FIG. 6 is an enlarged cross-sectional view as taken along line 6—6 of FIG. 3.

Referring again to FIG. 3, opening 52 permits feed wires from a source of electrical power to enter the interior of conduit box 10. As shown in FIG. 6, a flange 74 extends about the periphery of opening 52 in the illustrated embodiment. A cover plate 76 is removably attached to main box portion 50 such that a perimeter lip 78 thereof will surround flange 74. As with other junctions, cover plate 76 may be attached to flange 74 using any suitable attachment means. The illustrated embodiment, however, uses bolt and fastener combinations in registered holes as described above.

It will be appreciated that the interface between main box portion 50 and cover plate 76 will be water resistant in any desired orientation. A gasket 80 may also be provided to further enhance water resistance at this location. The feed wires may extend through grommetted holes in cover plate 76 in a manner similar to the prior art.

Figure 7:
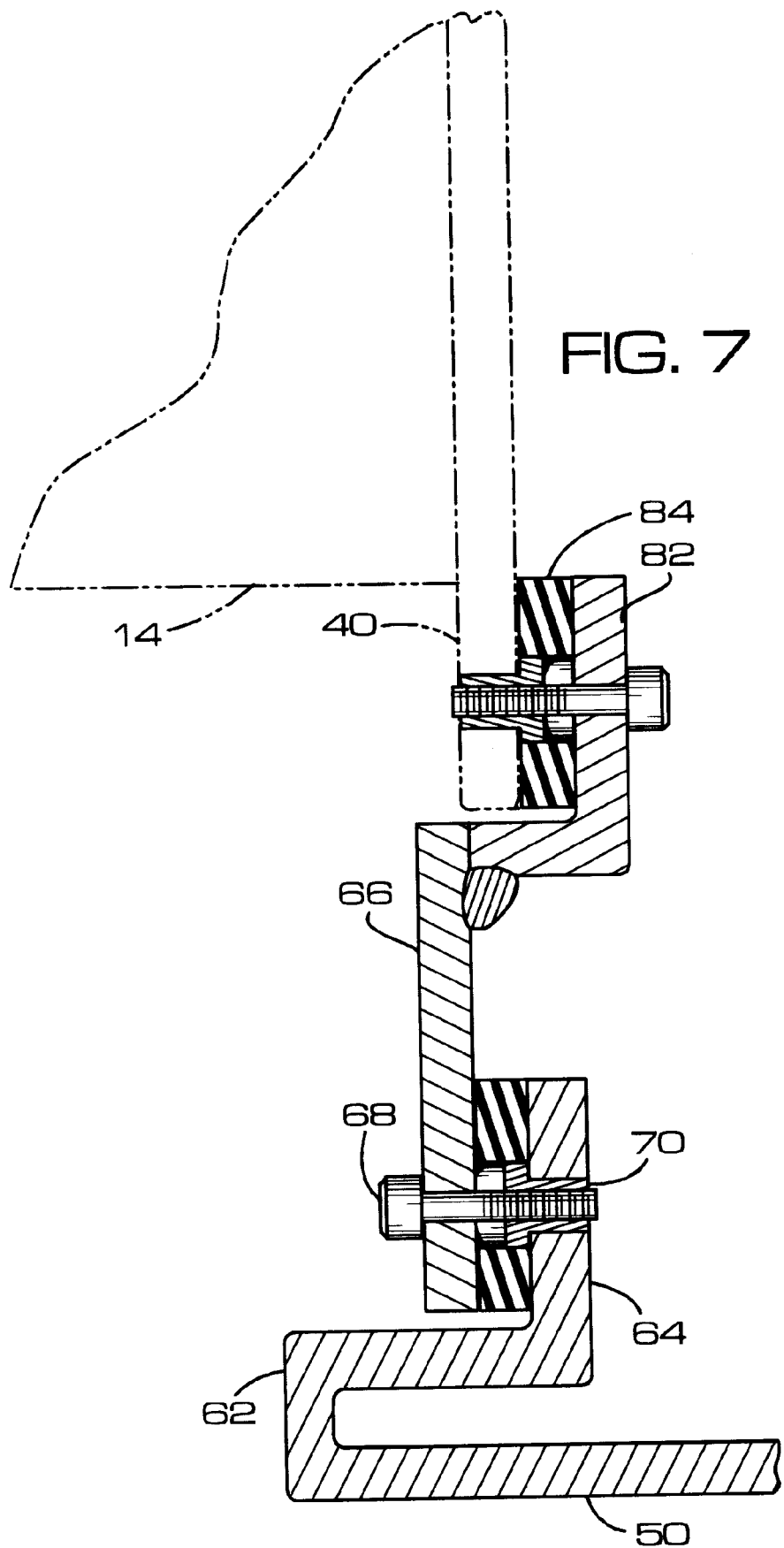
FIG. 7 is an enlarged cross-sectional view as taken along the lines 7—7 of FIG. 3.

FIG. 7 illustrates a preferred manner in which conduit box 10 may be attached to mounting structure 14 of electric motor 12. In this case, end plate 66 defines a recessed seat portion 82 into which mounting flange 40 is received. It will be appreciated that a recessed seat offers enhanced water resistance in comparison with prior art arrangements where the mounting flange was attached directly to a flat back plate. A gasket 84 may be situated between seat portion 82 and flange 40 to further enhance water resistance at this location. Bolt and fastener combinations as described above, or any other suitable mounting means, may be used to attach back plate 66 to mounting structure 14.

Various additional features of conduit box 10 will now be described with reference to FIGS. 8 and 9. As illustrated in FIG. 8, brackets, such as bracket 86, may be attached at the outer corners of main box portion 50, adjacent to flanges 54. In addition to advantageously providing stiffness, the corner brackets facilitate lifting of conduit box 10 during installation. For example, the brackets may be tapped with threaded holes as shown. Eye bolts, such as bolt 88, can be screwed into these holes for the attachment of lifting hardware.

Figure 9:
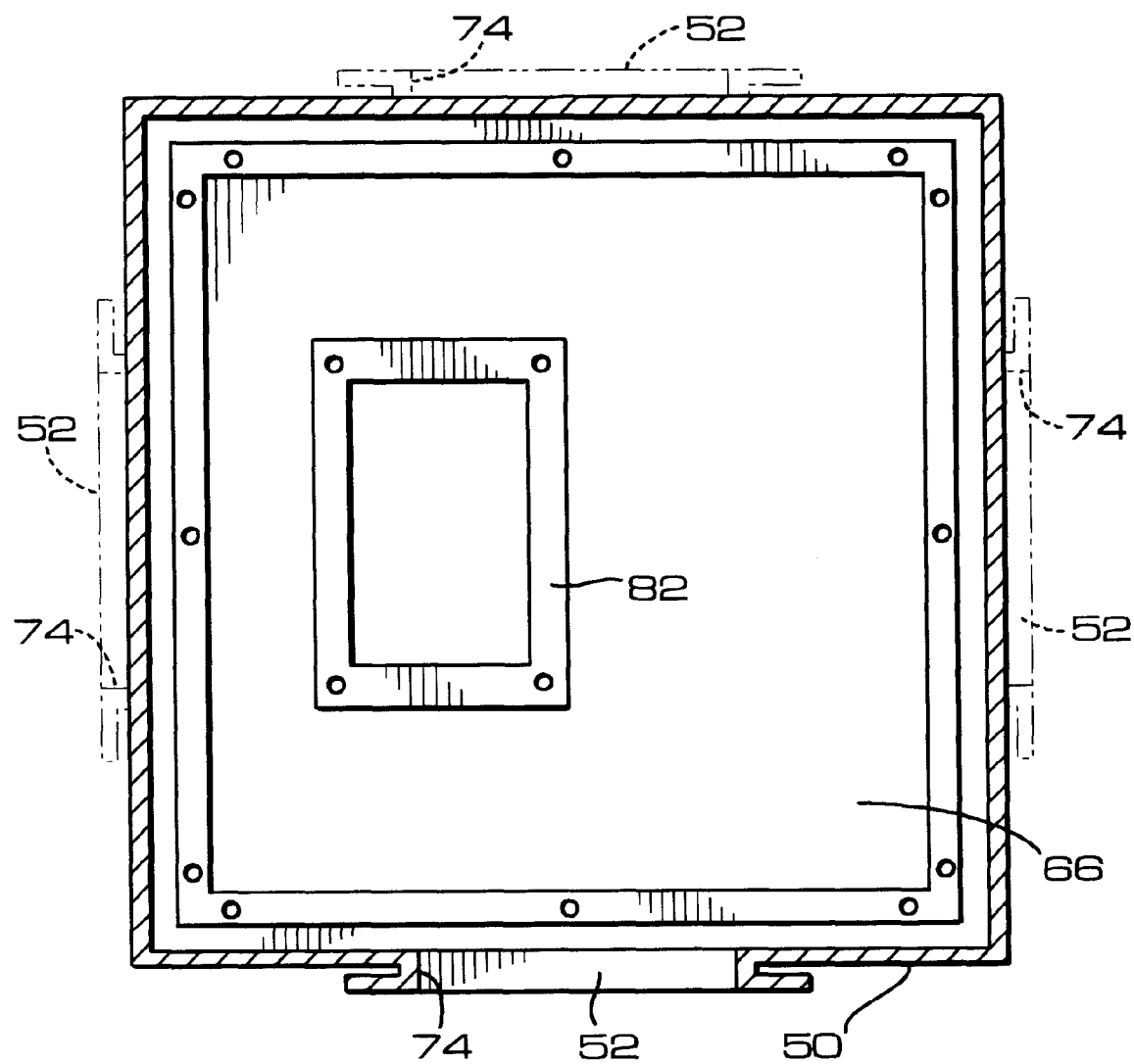
FIG. 9 is a cross-sectional view taken along line 9—9 of FIG. 8 diagrammatically illustrating various orientations in which the conduit box may be used.

A particular advantage of conduit box 10 is illustrated in FIG. 9. Specifically, conduit box 10 may be mounted in a plurality of orientations while still maintaining its water resistant characteristics. In this case, for example, main box portion 50 may be oriented in any one of four positions. This is accomplished by disattaching back plate 66, and "rotating" main box portion 50 to the desired position (in 90° increments). As a result, feed wire opening 52 may be located in the position that is most desirable in a particular application. The waterresistant features of conduit box 10, however, remain the same in any of the possible orientations.

It should be understood by those skilled in the art that a conduit box of the present invention may take various arrangements depending on the exigencies of a particular implementation. For example, end plates at both ends of the main box portion may be located in recessed seat structures as described above. Alternatively, outwardly-directed flanges may be used at both ends of the main box portion. Thus, aspects of these structures may be interchanged both in whole or in part. Furthermore, those of ordinary skill in the art will appreciate that the foregoing description is provided by way of example only and is not intended to be limiting of the invention so described in the appended claims.

What is claimed is:

1. A conduit box assembly for attachment to an electric motor, said assembly comprising:

a main box portion defining at least one open end;

said main box portion including a perimeter seat structure extending about said at least one open end and inwardly from side walls of said main box portion to define a recessed seat; and a first end plate received in said recessed seat and connected thereto such that said at least one open end of said main box portion is water resistant.

2. A conduit box assembly as set forth in claim 1, wherein said recessed seat is adapted for connection to said first end plate in a plurality of orientations.

3. A conduit box assembly as set forth in claim 2, wherein said first end plate is substantially square and said recessed seat is adapted to be attached thereto in any of four rotated orientations.

4. A conduit box assembly as set forth in claim 1, wherein said first end plate defines a lead wire opening having a recessed seat portion thereabout for receipt of a mounting flange.

5. A conduit box assembly as set forth in claim 1, further comprising lifting brackets located on an outer surface of said main box portion.

6. A conduit box assembly as set forth in claim 5, wherein said lifting brackets extend about an outside corner of said main box portion to provide enhanced stiffness thereto.

7. A conduit box assembly as set forth in claim 6, wherein at least one removable eye-bolt is threaded into at least one of said lifting brackets.

8. A conduit box assembly as set forth in claim 1, wherein said perimeter seat structure comprises:

a first flange part integrally extending from side walls of side said main box portion in a first perpendicular direction;

a second flange part integrally extending from said first flange part in a second perpendicular direction generally parallel to said side walls of said main box portion; and a third flange part integrally extending from said second flange part in said first perpendicular direction.

9. A conduit box assembly as set forth in claim 1, wherein said at least one open end of said main box portion comprises first and second open ends.

10. A conduit box assembly as set forth in claim 9, wherein said main box portion includes a perimeter flange structure extending about said second open end and outwardly away from said side walls of said main box portion.

11. A conduit box assembly as set forth in claim 10, further comprising a second end plate having a perimeter lip extending generally perpendicular to a main plate portion thereof, said second end plate being removably connected to said flange structure so that said perimeter lip is received thereover and said second open end of said main box portion is thereby water resistant.

12. A conduit box assembly as set forth in claim 1, wherein at least one of said side walls of said main box portion defines a covered feed wire opening.

13. A conduit box assembly for attachment to an electric motor, said assembly comprising:

a main box portion having at least one open end;

said main box portion including a perimeter flange structure extending about said at least one open end and outwardly away from side walls of said main box portion; and a first end plate having a perimeter lip extending generally perpendicular to a main plate portion thereof, said first end plate being removably connected to said flange structure so that said perimeter lip extends over said flange structure and thereby surrounds same, said at least one open end of said main box portion thereby being rendered water resistant.

14. A conduit box assembly as set forth in claim 13, wherein said at least one open end of said main box portion comprises first and second open ends.

15. A conduit box assembly for attachment to an electric motor, said assembly comprising:

a main box portion having first and second open ends;

said main box portion including a perimeter flange structure extending about said first open end and outwardly away from side walls of said main box portion;

said main box portion further including a perimeter seat structure extending about said second open end and inwardly from said side walls of said main box portion to define a recessed seat; and a first end plate having a perimeter lip extending generally perpendicular to a main plate portion thereof, said first end plate being removably connected to said flange structure so that said perimeter lip extends thereover and said first open end of said main box portion is thereby water resistant.

16. A conduit box assembly as set forth in claim 15, further comprising a second end plate received in said recessed seat and connected thereto so that said second open end of said main box portion is water resistant.

17. A conduit box assembly as set forth in claim 16, wherein said recessed seat is adapted for connection to said second end plate in a plurality of orientations.

18. A conduit box assembly as set forth in claim 17, wherein said second end plate is substantially square and said recessed seat is adapted to be attached thereto in any of four rotated orientations.

19. A conduit box assembly as set forth in claim 16, wherein said second end plate has a lead wire opening defining a recessed seat portion thereabout for receipt of a mounting flange therein.

20. A conduit box assembly as set forth in claim 13, further comprising lifting brackets located on an outer surface of said main box portion.

21. A conduit box assembly as set forth in claim 20, wherein said lifting brackets extend about an outside corner of said main box portion to provide enhanced stiffness thereto.

22. A conduit box assembly as set forth in claim 21, wherein at least one removable eye-bolt is threaded into at least one of said lifting brackets.

23. A conduit box assembly as set forth in claim 13, wherein at least one of said side walls of said main box portion defines a feed wire opening having a cover plate located thereon.

24. A conduit box assembly for attachment to an electric motor, said assembly comprising:

a main box portion;

at least one side wall of said main box portion defining a feed wire opening, said feed wire opening having a flange structure thereabout; and a cover plate removably attached to said flange structure, said cover plate having a perimeter lip extending about said flange structure of said at least one side wall such that said feed wire opening will be water resistant.

* * * * *